UNITED STATES PATENT OFFICE.

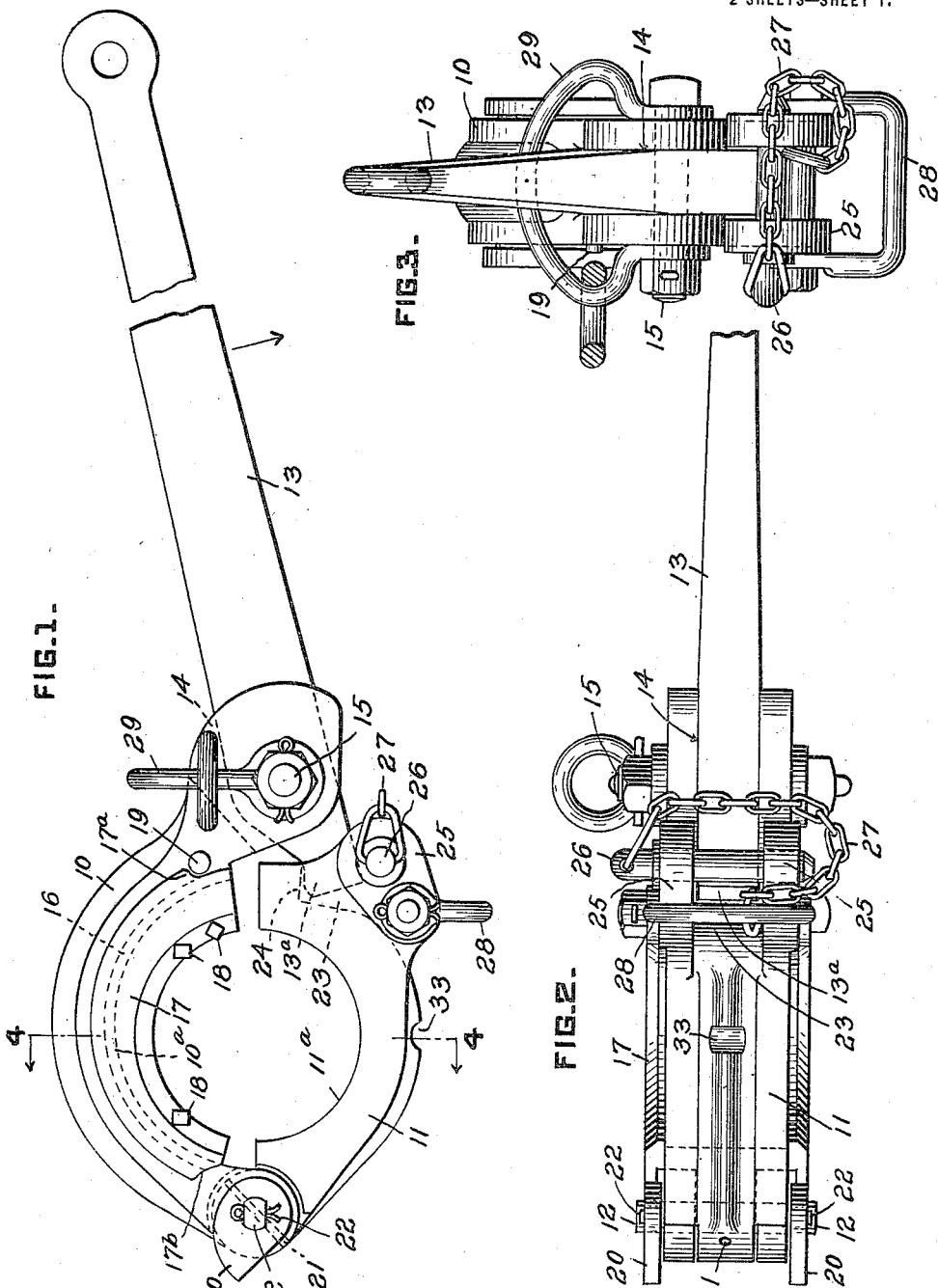

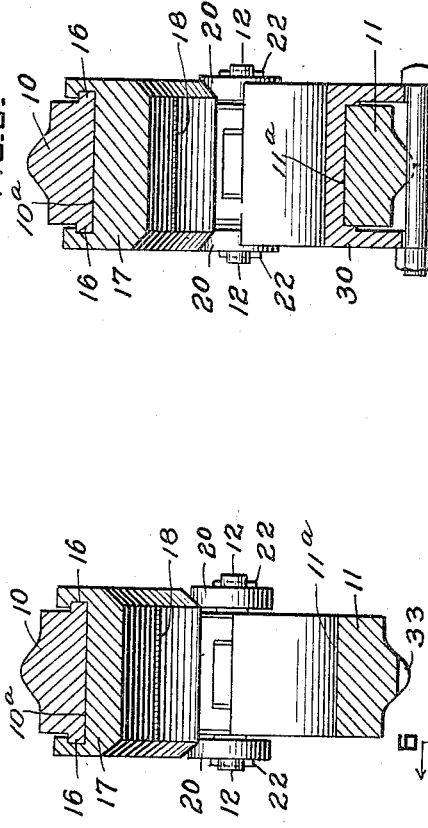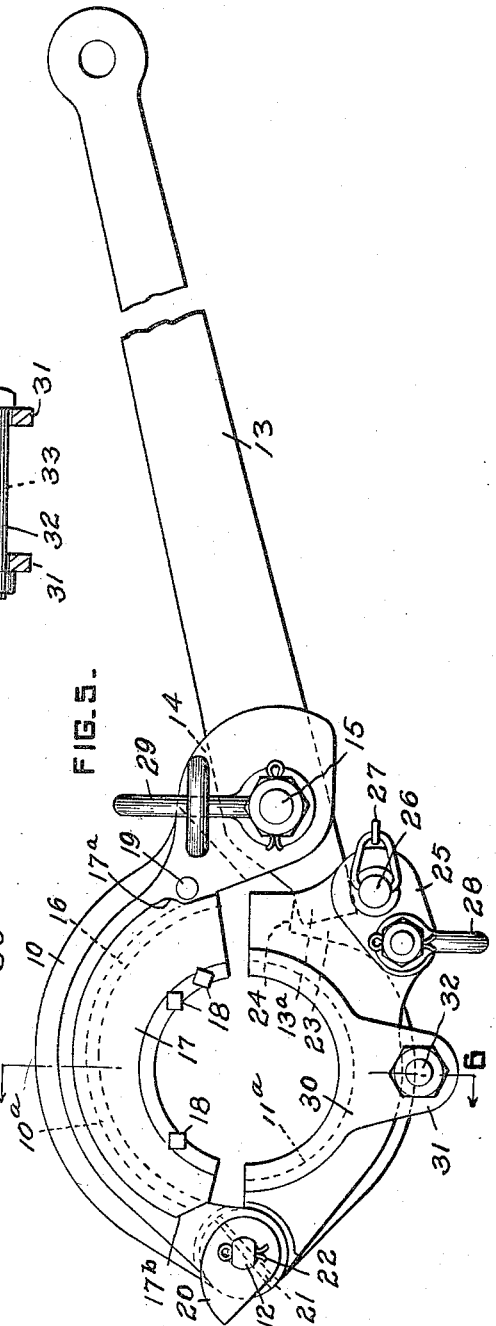

EDGAR E. GREVE, OF PITTSBURGH, PENNSYLVANIA, ASSIGNOR TO OIL WELL SUPPLY COMPANY, OF PITTSBURGH, PENNSYLVANIA, A CORPORATION OF PENNSYLVANIA.

PIPE-TONGS.

1,169,077.    Specification of Letters Patent.    Patented Jan. 18, 1916.

Application filed March 20, 1915. Serial No. 15,806.

*To all whom it may concern:*

Be it known that I, EDGAR E. GREVE, a citizen of the United States, residing at Pittsburgh, in the county of Allegheny and State of Pennsylvania, have invented certain new and useful Improvements in Pipe-Tongs, of which the following is a specification.

This invention relates to improvements in pipe tongs, and more particularly to devices of this character adapted to manipulate well-casing.

Pipe tongs or wrenches capable of performing desired work in connection with well casing, such as threading to secure or disengage casing sections, breaking joints, etc., are required to be massive and of great strength, the casing sections being generally of considerable diameter and weight. As the connections are such as to require bodily movements of sections in various positions, the weight of the sections as well as the conditions of the couplings or connections tend to cause considerable difficulty in connecting and disconnecting, the tongs or wrenches must necessarily be of a type capable of sustaining heavy pressures during the manipulating action. For instance, where casing sections are to be separated or joined, the manual power required is that provided by three or four operators, the pressure being applied to the handle of the tongs; as a result, it has heretofore generally been the practice to perform only the initial releasing action and the final joining action by means of these tongs or wrenches, other means being employed for providing the remainder of the threading action. While it is possible to substitute machine power for the manual power referred to, as by employing the crank of the well machinery and a counterweight, these being connected to the handle of the tongs or wrench to provide for movements in opposite directions during the rotation of the crank, the tongs or wrench, to permit this operation must be capable of positive gripping action as well as quick gripping and releasing action. The tongs should also be capable of adjustment to various size casing sections and capable of being suspended to operate with either side of the tongs upward, since the application of power may be in either direction. Such device should also be capable of quick release to permit disengagement of the tongs as an entirety from the casing.

The present invention provides a construction which meets these various conditions, thereby overcoming different objections present in prior constructions, and at the same time provides a device which is simple and efficient in operation, durable in construction, and which can be manufactured at a minimum cost.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

In the accompanying drawings, in which similar reference characters indicate similar parts in each of the views, Figure 1 is a side elevation of a wrench constructed in accordance with my invention, the parts being arranged to grip the collar of the casing; Fig. 2 is a front elevation of the same; Fig. 3 is a view of the structure disclosed in Fig. 1 looking from the right of the figure toward the left; Fig. 4 is a sectional view taken on the line 4—4 of Fig. 1; Fig. 5 is a view similar to Fig. 1 showing the parts in position to grip the pipe or casing; and Fig. 6 is a sectional view taken on line 6—6 of Fig. 5.

In the drawings, 10 and 11 indicate the two jaws of the tongs or wrench, said jaws being connected together by means of a member 12 hereinafter more particularly referred to, the connection being such that the said jaws are capable of relative pivotal movement with the member 12 as the axis of such movement.

Each jaw has its inner face curved on the arc of a circle; the radius of the arc of jaw 10 is greater than that of jaw 11. Said inner faces are indicated respectively at 10$^a$ and 11$^a$. As a result of this arrangement, the body of jaw 10 has its general direction of length leading outside that of jaw 11.

The jaw 10 carries the handle, indicated at 13, and is therefore referred to herein as the handle is moved pivotally. The handle within a recess 14 formed in such outside portion of the jaw 10, a bolt 15 extending through the jaw and handle and on which the handle is movable pivotally. The handle 13 is of the desired length and has its inner end formed with a projecting portion 13ª adapted to project into a recess in the jaw 11 as presently referred to. As will be readily understood, this particular relation of the free ends of the jaws enables bolt 15 to be located between the lines of the inner and outer faces of member 10 without requiring an excessive width of jaw or the use of projections of excessively heavy weight.

The jaw 10 is preferably formed with a pair of ribs or flanges 16, following the curvature of the inner face 10ª, this arrangement causing these ribs or flanges to extend eccentrically with respect to the gripping line of the jaw, as shown more particularly in Figs. 1 and 5. These ribs or flanges form guides for a slip 17 which, as shown in Figs. 4 and 6, is provided with recesses adapted to receive them. Said ribs or flanges constitute guides on which the slip may move in the direction of length of the guides, the slip having a face complemental to and adapted to contact with the inner face 10ª of the jaw, said jaw thereby forming the support for the slip while the latter is subjected to the gripping pressure. The inner face of the slip extends on a line concentric with the axis of the casing to be operated upon, and the guides are eccentric to such faces, the slip, therefore, having its outer face eccentric with respect to its inner face. If desired, the slip may be provided with angular members 18 which serve to grip the casing when the tongs are tightened; these members may be omitted and friction alone be depended upon for gripping purposes, especially where the casing is substantially free from mud, etc.; where the casing is so coated as would prevent efficient action by the tongs when friction alone is depended upon, the members 18, if employed, will tend to prevent slipping.

As will be readily understood, the slip 17 is removable from the jaw 10 by moving the slip on the guides toward the free end of the jaw, thus providing an additional advantage in the particular relation of the free ends of the jaws, such relation permitting this slip removal without requiring excessive opening of the jaws. This permits of the use of slips of different sizes as shown for instance in Figs. 1 and 5. To prevent accidental removal, I preferably employ a pin 19 which, after the slip is inserted, is placed in position behind a shoulder 17ª of the slip, said shoulder and pin acting to limit the movement of the slip in one direction. The opposite end of the slip is provided with a cut-away portion 17ᵇ which is adapted to co-act with a cam 20 hereinafter referred to, said cam acting to limit the movement of the slip in the opposite direction.

The pin 12 is adapted to extend through knuckles formed on the jaws 10 and 11 and is secured to jaw 11 to rotate therewith by suitable means such as a pin 21. Since the jaw 11 is preferably the movable jaw, the pin 12 will rotate freely in the knuckles of the jaw 10 during the movements of jaw 11. The opposite ends of the pin 12 are preferably non-circular in contour and are adapted to carry cams 20, the latter having an opening complemental to such non-circular form so that the movements of the pin will impart corresponding movements to the cams 20, the structure preferably employing a cam at each end of the pin. The cams are preferably held against movement longitudinally of the pin by suitable means such as cotter pins 22. By this arrangement, it will be understood, that when the jaws are in a closed position, the cams 20 will be spaced from the ends of the slip 17 so that the latter is free to move on its guides toward the cams should such movement take place, and that an opening of the jaws will cause the cams 20 to contact with the slip and cause it to automatically retrace its movement and place the slip at its opposite extreme of movement. This particular action of the slip 17 not only enables the tongs to accommodate themselves to slight variations in size of the casing being gripped, but also provides a tightening action during the application of pressure on the handle 13, thereby preventing any liability of the parts slipping in use. When the handle is moved in the opposite direction, this tightening action is reversed and a tendency to release the firm grip is had, thus permitting the tongs to shift position and secure a new hold on the casing for the succeeding application of pressure. A similar release is had when the jaw 11 is entirely opened, the cams 20 automatically moving the slip 17 to its opposite extreme of movement.

The jaw 11, as heretofore pointed out, is provided with a recess 23 adjacent its free end and a shoulder 24 against which the free end of the handle 13 is adapted to operate in gripping the casing. Said jaw is also provided with opposing lugs 25 between which said recess extends, said lugs being provided with alined openings to receive a pin 26, said pin being preferably connected to a fixed portion of the jaw by a chain or other suitable connection 27. The pin 26, when in position, extends in the path of movement of the inner end of the handle 13, and, consequently, when said pin is so positioned, movements of the handle in opposite directions will serve to provide opening and closing movements to the jaw 11 within prescribed limits, these limits, however, being sufficient to permit the shift in position of the tongs on the casing. Where a prolonged threading operation is not desired, as when breaking a joint, the presence of the pin is not necessary, the application of pressure being in one direction only. The jaw 11 also carries a hand grip 28 to enable the ready manipulation of the jaw. The pin 15 preferably carries a supporting link 29, the latter preferably having a shape which is non-circular, one form being indicated in Fig. 3. This particular shape permits the wrench to be swung to either side without disengaging any of the fastening means when the wrench is suspended from a point above, an obvious advantage where it is necessary to shift the direction in which the pressure is to be supplied, it being understood that a suitable chain or other structure is connected to the member 29 and supported from a point above the wrench.

The construction of pipe tongs above described (illustrated more particularly in Fig. 1) has the inner face of the jaw 11 conforming to the size of a casing collar or coupling. Where it is desired to operate the tongs or wrench in connection with a portion of the casing of smaller diameter, I preferably apply a liner 30 to the inner face of the jaw 11, said liner projecting on opposite sides of the jaw and having outwardly extending lugs 31 adapted to receive a bolt 32 which may be placed in position when the openings of the lugs are in alinement with a notch 33 of the jaw 10, as shown more particularly in Figs. 5 and 6. When in this position, the bolt 32 not only retains the liner from withdrawal, but also prevents shifting of the liner during the application of pressure, the engagement of bolt 32 and notch 33 holding the liner against any shifting action. When the liner 30 is employed, I preferably employ a slip 17 of complemental size, thus decreasing the diameter of the opening between the jaws when the latter are in gripping position.

With an arrangement such as above described and with the jaws open (the pin 26 being out of position), the tongs are connected up to the support and the jaws closed about the article to be operated upon, the jaw 11 being swung toward jaw 10 for this purpose. This places recess 23 in position to receive the inner end of the handle 13, thus providing an engagement between the handle 13 and shoulder 24. If the operation is simply to break a joint, the pin 26 is not introduced, but pressure is applied to the handle in the direction of the arrow with the result that the two jaws will be caused to grip the casing, the slip 17 moving toward cam 20 should there be any tendency of a slipping action of the tongs on the casing, so as to quickly set the tongs in position to provide the desired action on the casing itself by a continued movement of the handle; when the joint has been broken, a movement of the handle in the reverse direction frees the jaw 11 which can then be withdrawn to open the tongs, such withdrawing action serving to move the slip 17 to its initial position.

Should it be desired to operate the tongs to provide a continued threading action, the pin 26 is inserted behind the inner end of the handle after the latter has moved to its engagement with shoulder 24, the result being that on the reverse movement of the handle, the inner end of the latter cannot be withdrawn from the recess 23 but will contact with pin 26 and thus cause the entire tongs to be swung about the casing to the proper point, whereupon a return movement of the handle will again provide the gripping action.

As will be readily understood, the tongs herein disclosed provide for a quick gripping action, the direction of pressure application serving to positively set the jaws on the casing, any tendency to slip simply acting to cause the jaws to more firmly bind the casing through the movement of the slip 17 toward cam 20. While this may tend to cause the slip 17 to closely bind on the casing, opening of the jaw 11 will relieve this condition through the action of cams 20, the jaw 11 acting as a lever in forcing this movement of the slip 17. Furthermore, the tongs or wrench is so constructed as to meet each of the conditions which may arise in operations of this character, the arrangement being simple and efficient in operation, of a comparatively few parts, durable in construction, and which can be manufactured at a relatively low cost.

What I claim is:—

1. A pipe tongs or wrench comprising a pair of hinged jaws, an operating handle carried by one jaw and adapted to coöperate with the other jaw to effect clamping action, one of said jaws having a wall eccentric with the gripping surfaces of the tongs or wrench, and a movable slip in contact with said wall, said slip having a gripping face and movable in a path eccentric to its gripping face to decrease the distance between the jaws during the application of gripping pressure.

2. A pipe tongs or wrench comprising a pair of hinged jaws, an operating handle carried by one jaw and adapted to coöperate with the other jaw to effect clamping action, one of said jaws having a wall eccentric with the gripping surfaces of the tongs or wrench, and a movable slip in contact with said wall, said slip having a gripping face and movable in a path eccentric to its gripping face to decrease the distance between the jaws during the application of gripping pressure, and means actuated by the movement of the other jaw to cause the slip to retrace its said movement.

3. A pipe tongs or wrench comprising a pair of hinged jaws, an operating handle carried at the free end of one jaw, said handle having an extension, said handle carrying jaw having a wall eccentric with the gripping surfaces of the tongs or wrench and a movable slip carried by this jaw and disposed in contact with the wall, said slip movable in one direction in a path eccentric with the gripping surfaces of the tongs to decrease the distance between said surfaces, the other of said jaws having its free end provided with a recess and a shoulder, said shoulder coöperating with the handle extension to provide gripping pressure, and means actuated by the movement of the last mentioned jaw to cause the slip to move in an opposite direction.

4. A pipe tongs or wrench comprising a pair of jaws, a pin connecting said jaws, said pin being fixedly secured to one of the jaws and movable with respect to the other jaw, a movable slip carried by one of said jaws, means on the pin for effecting a movement of the slip, an operating handle, and means whereby said handle may act to provide a gripping pressure by said jaws.

5. A pipe tongs or wrench comprising a pair of hinged jaws, said jaws having their inner faces curved with the radius of the curve greater in one jaw than in the other to provide a jaw face eccentric with respect to the face of the other jaw, an operating handle carried by one jaw and adapted to coöperate with the other jaw to provide clamping action, and a slip positioned in contact with said eccentric face and having a gripping face curved on approximately the radius of the other jaw, said slip being movable in a direction to decrease the distance between the gripping faces during movement of both jaws relative to the structure being gripped in providing the gripping pressure.

6. A pipe tongs or wrench comprising a pair of hinged jaws, an operating handle carried by one jaw and adapted to coöperate with the other jaw to provide clamping action, and a slip carried by one of said jaws and movable in a direction to decrease the distance between the gripping faces of the jaws during movement of both jaws relative to the structure being gripped in providing the gripping pressure, and means whereby opening movements of the other jaw will automatically provide a retracing of such movement by the slip.

7. A pipe tongs or wrench comprising a pair of hinged jaws, an operating handle carried by one jaw and adapted to coöperate with the other jaw to provide clamping action, and a slip carried by one of said jaws and movable in a direction to decrease the distance between the gripping faces of the jaws during the application of gripping pressure, and cam members movable with the other jaw for causing the slip to retrace its movements.

8. A pipe tongs or wrench comprising a pair of hinged jaws, said jaws having their inner faces curved with the radius of the curve greater in one jaw than in the other to provide a jaw face eccentric with respect to the face of the other jaw, an operating handle carried by one jaw and adapted to coöperate with the other jaw to provide clamping action, and a slip positioned in contact with said eccentric face and having a gripping face curved on approximately the radius of the other jaw, said slip being movable in a direction to decrease the distance between the gripping faces during movement of both jaws relative to the structure being gripped in providing the gripping pressure, and means for limiting the movements of the slip in either direction.

9. A pipe tongs or wrench comprising a pair of hinged jaws, an operating handle carried by one jaw and adapted to coöperate with the other jaw to provide clamping action, and a slip carried by one of said jaws and movable in a direction to decrease the distance between the gripping faces of the jaws during movement of both jaws relative to the structure being gripped in providing the gripping pressure, and a liner fixedly carried by the other jaw.

10. A pipe tongs or wrench comprising a pair of hinged jaws, an operating handle carried by one jaw and adapted to coöperate with the other jaw to provide clamping action, and a slip carried by one of said jaws and movable in a direction to decrease the distance between the gripping faces of the jaws during movement of both jaws relative to the structure being gripped in providing the gripping pressure, a liner carried by the other jaw, and a pin carried by said liner and coöperating with said jaw for holding the liner against movement.

11. In combination, a pipe tongs or wrench having hinged jaws, a handle adapted to provide relative movements to said jaws to produce a clamping action, a non-circular closed suspending member carried by one of the jaws, and suspending means including a link slidable on said member, whereby the tongs or wrench is shiftable to reverse the positions of the sides without manipulation of the suspending means.

12. A pipe tongs or wrench comprising a pair of jaws, a pin for connecting the jaws and carrying an eccentric, a slip carried by one of the jaws and movable relatively thereto in a path eccentric to the slip gripping face, said movements being toward and from said eccentric carried by the pin, and means for operatively connecting the said eccentric to the other jaw whereby opening movements of said latter jaw will cause said pin eccentric to reverse the direction of movement of the slip.

13. A pipe tongs or wrench comprising a pair of jaws, a pin for connecting the jaws and carrying an eccentric, a slip carried by one of the jaws and movable relatively thereto in a path eccentric to the slip gripping face, said movements being toward and from said eccentric carried by the pin, and means for operatively connecting the said eccentric to the other jaw whereby opening movements of said latter jaw will cause said pin eccentric to reverse the direction of movement of the slip, said means embodying complemental non-circular contacting surfaces carried by the pin and eccentric, said pin being fixedly secured to the movable jaw.

In testimony whereof I affix my signature in presence of two witnesses.

EDGAR E. GREVE.

Witnesses:
A. H. McNAMEE,
W. G. DOOLITTLE.